United States Patent
Matsumoto et al.

(10) Patent No.: US 10,122,246 B2
(45) Date of Patent: Nov. 6, 2018

(54) MULTI-GAP ROTATING ELECTRIC MACHINE WITH COOLING OIL GUIDE CHANNELS FOR SIDE STATOR COIL

(71) Applicant: DENSO CORPORATION, Kariya, Aichi-pref. (JP)

(72) Inventors: Takafumi Matsumoto, Nishio (JP); Hirohito Matsui, Nishio (JP); Koji Asagara, Nishio (JP); Takeo Maekawa, Kariya (JP); Keiji Kondou, Kariya (JP)

(73) Assignee: DENSO CORPORATION, Kariya (JP)

( * ) Notice: Subject to any disclaimer, the term of this patent is extended or adjusted under 35 U.S.C. 154(b) by 186 days.

(21) Appl. No.: 15/071,732

(22) Filed: Mar. 16, 2016

(65) Prior Publication Data

US 2016/0276904 A1 Sep. 22, 2016

(30) Foreign Application Priority Data

Mar. 16, 2015 (JP) .................. 2015-052694

(51) Int. Cl.
*H02K 9/19* (2006.01)
*H02K 5/20* (2006.01)
*H02K 16/04* (2006.01)
*H02K 3/24* (2006.01)

(52) U.S. Cl.
CPC .................. *H02K 9/19* (2013.01); *H02K 3/24* (2013.01); *H02K 5/20* (2013.01); *H02K 16/04* (2013.01)

(58) Field of Classification Search
CPC .......... H02K 9/19; H02K 9/193; H02K 9/197; H02K 9/20; H02K 3/24; H02K 1/20; H02K 5/20; H02K 16/04

USPC ....................................................... 310/52–65
See application file for complete search history.

(56) References Cited

U.S. PATENT DOCUMENTS

| | | | |
|---|---|---|---|
| 2003/0071525 A1* | 4/2003 | Tong | H02K 1/20 310/65 |
| 2011/0316367 A1 | 12/2011 | Takahashi et al. | |
| 2012/0062056 A1* | 3/2012 | Bradfield | H02K 9/19 310/58 |

FOREIGN PATENT DOCUMENTS

| | | | | |
|---|---|---|---|---|
| JP | 2014-176203 A | | 9/2014 | |
| JP | 2014176203 A | * | 9/2014 | ............... H02K 9/19 |

OTHER PUBLICATIONS

Machine translation of JP 2014176203 A (Sep. 2014).*

* cited by examiner

*Primary Examiner* — Michael Andrews
(74) *Attorney, Agent, or Firm* — Oliff PLC (57) ABSTRACT

In a multi-gap rotating electric machine, a side stator coil is received in a side space formed in a housing to connect radially inner and radially outer stator coils across a rotor. A cooling oil flow adjustment member is provided to adjust flow of cooling oil in the side space. The adjustment member has cooling oil guide channels formed on an uneven surface thereof facing the side stator coil. When viewed along a central axis of a rotating shaft: on an upper apart of the uneven surface which is located above the central axis, the cooling oil guide channels spread from a reference line to both sides of the reference line while extending downward; and on a lower part of the uneven surface which is located below the central axis, the cooling oil guide channels converge on the reference line from both sides of the reference line while extending downward.

9 Claims, 8 Drawing Sheets

MULTI-GAP ROTATING ELECTRIC MACHINE WITH COOLING OIL GUIDE CHANNELS FOR SIDE STATOR COIL

CROSS-REFERENCE TO RELATED APPLICATION

This application is based on and claims priority from Japanese Patent Application No. 2015-52694 filed on Mar. 16, 2015, the content of which is hereby incorporated by reference in its entirety into this application.

BACKGROUND

1. Technical Field

The present invention relates to a multi-gap rotating electric machine capable of effectively cooling a stator coil.

2. Description of Related Art

There are known rotating electric machines which are used in a narrow space and thus required to be flat in shape, such as an engine direct-coupled motor that is arranged between an engine and a transmission in a motor vehicle. Moreover, for increasing the output torque, these rotating electric machines are configured as multi-gap rotating electric machines which have a plurality of magnetic gaps formed therein.

For example, Japanese Patent Application Publication No. JP2014176203A discloses a double-stator motor which is configured to include a rotor and inner and outer stators. The inner stator is disposed radially inside the rotor with a radially inner magnetic gap formed between the inner stator and the rotor. The outer stator is disposed radially outside the rotor with a radially outer magnetic gap formed between the outer stator and the rotor. With this configuration, it is possible for the double-stator motor to generate higher torque than a single-stator motor.

Moreover, the double-stator motor has a cooling structure provided therein. Specifically, the double-stator motor has: a first cooling oil introduction passage formed in a rotating shaft of the motor to introduce cooling oil from the outside of a housing of the motor to a radially inner cooling space formed between a radially inner surface of an inner stator core and a radially outer surface of a large-diameter portion of the rotating shaft; a second cooling oil introduction passage formed in a ceiling part of the housing to introduce cooling oil from the outside of the housing to a radially outer cooling space formed between a radially outer surface of an outer stator core and an interior circumferential surface of the housing; and a third cooling oil introduction passage formed in the ceiling part of the housing to introduce cooling oil from the outside of the housing to a side cooling space formed between a side surface of a side stator core and an interior side surface of the housing. In operation, cooling oil is introduced from the outside of the housing to the radially inner, radially outer and side cooling spaces via the first to the third cooling oil introduction passages, thereby cooling the inner, outer and side stator cores.

Furthermore, in the third embodiment of the above patent document, a plurality of arc-shaped protrusions are formed on an upper part of the interior side surface of the housing to guide the cooling oil introduced to the side cooling space to circumferentially spread.

With the arc-shaped protrusions, it is possible to reliably supply the cooling oil to an upper part of a side stator coil which is located above the central axis of the rotating shaft, thereby effectively cooling the upper part. However, since there are no cooling oil guide members provided below the central axis of the rotating shaft, it may be difficult to reliably supply the cooling coil to a lower part of the side stator coil which is located below the central axis of the rotating shaft. Consequently, it may be difficult to effectively cool the lower part of the side stator coil.

SUMMARY

According to exemplary embodiments, a multi-gap rotating electric machine is provided which includes a housing, a rotating shaft, an annular rotor, an inner stator, an outer stator, a side stator coil, a side space and a cooling oil introduction passage. The rotating shaft is rotatably supported by the housing. The rotor is mechanically connected to the rotating shaft so as to rotate together with the rotating shaft. The inner stator includes an inner stator core and an inner stator coil. The inner stator core is arranged radially inside the rotor with a radially inner gap formed between the inner stator core and the rotor. The inner stator coil is wound on the inner stator core. The outer stator includes an outer stator core and an outer stator coil. The outer stator core is arranged radially outside the rotor with a radially outer gap formed between the outer stator core and the rotor. The outer stator coil is wound on the outer stator core. The side stator coil is arranged on one axial side of the rotor to connect the inner and outer stator coils radially across the rotor. The side space is formed between axial end surfaces of the inner and outer stator cores and an interior side surface of the housing. In the side space, there is received the side stator coil. The cooling oil introduction passage is formed in an upper part of the housing to introduce cooling oil from outside of the housing to the side space. The cooling oil introduction passage has a cooling oil inlet formed at its upper end so as to be open to the outside of the housing and a cooling oil outlet formed at its lower end so as to be open to the side space. The cooling oil flow adjustment member is provided between the interior side surface of the housing and the side stator coil to adjust flow of the cooling oil in the side space. The cooling oil flow adjustment member has an uneven surface that faces the side stator coil through a cooling oil flow gap formed therebetween and includes a plurality of protrusions and a plurality of recesses. The protrusions and the recesses together form a plurality of cooling oil guide channels on the uneven surface of the cooling oil flow adjustment member. When viewed along a central axis of the rotating shaft: on an upper apart of the uneven surface which is located above the central axis of the rotating shaft, the cooling oil guide channels spread from a reference line to both sides of the reference line while extending downward; and on a lower part of the uneven surface which is located below the central axis of the rotating shaft, the cooling oil guide channels converge on the reference line from both sides of the reference line while extending downward.

With the above configuration, the cooling oil having flowed into the cooling oil flow gap via the cooling oil outlet flows by surface tension in the extending directions of the side stator coil (i.e., radial directions of the rotating shaft). At the same time, at the intersections between the side stator coil and the cooling oil guide channels formed on the uneven surface of the cooling oil flow adjustment member, part of the cooling oil flows into and through the cooling oil guide channels. Consequently, it becomes possible to increase the contact area and contact time of the cooling oil with the side stator coil. As a result, it becomes possible to dissipate, via the cooling oil, an increased amount of heat from the side stator coil, thereby improving the cooling performance of the entire multi-gap rotating electric machine.

It is preferable that when viewed along the central axis of the rotating shaft, the reference line coincides with a central axis of the cooling oil outlet of the cooling oil introduction passage.

It is also preferable that the reference line vertically extends through the central axis of the rotating shaft.

The cooling oil flow adjustment member may be preferably formed as a separate member from the housing and fixed to the interior side surface of the housing so as to make up an integral body with the housing.

It is preferable that the cooling oil flow adjustment member has a hardness lower than an insulating-coat hardness of the side stator coil.

It is also preferable that the cooling oil flow adjustment member is made of an electrically insulative material whose hardness is lower than or equal to E50 according to JIS B 7726.

In some of the exemplary embodiments, the uneven surface of the cooling oil flow adjustment member is formed so that the protrusions and the recesses extend straight in each of a plurality of directions.

In the other exemplary embodiments, the uneven surface of the cooling oil flow adjustment member is formed so that the protrusions and the recesses extend in a curved manner.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Exemplary embodiments will be described hereinafter with reference to FIGS. 1-15. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

Figure 1:
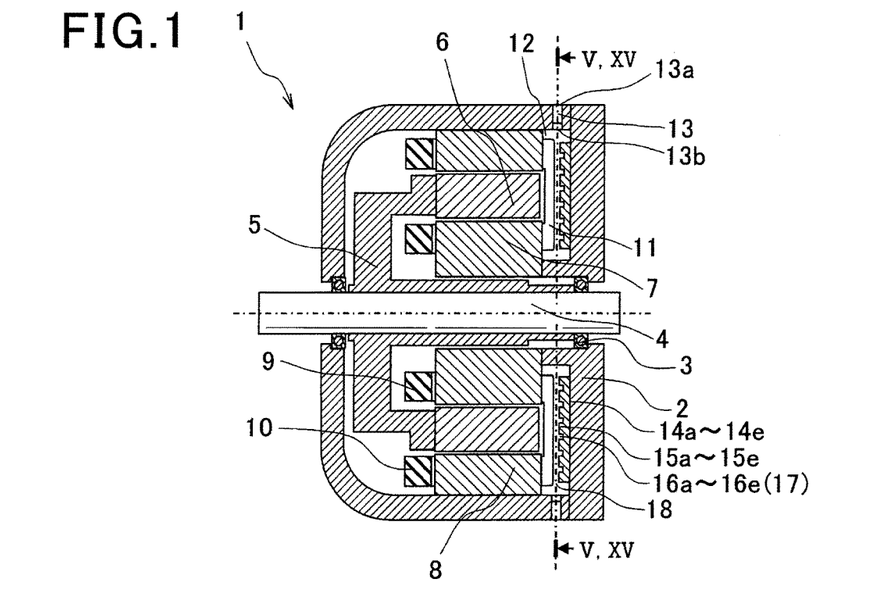
FIG. 1 is a cross-sectional view of a multi-gap rotating electric machine according to the exemplary embodiments.

FIG. 1 shows the overall configuration of a multi-gap rotating electric machine 1 according to the exemplary embodiments. The multi-gap rotating electric machine 1 may be used, for example in a motor vehicle, as an electric motor, an electric generator or a motor-generator that selectively functions either as an electric motor or as an electric generator.

In the multi-gap rotating electric machine 1, as shown in FIG. 1, a rotating shaft 4 is rotatably supported by a housing 2 via a pair of bearings 3. On one end portion (i.e., a left end portion in FIG. 1) of the rotating shaft 4, there is fixed a substantially top-shaped rotor disc 5 that has an annular axial end surface. To the axial end surface of the rotor disc 5, there is fixed an annular rotor 6. The rotor 6 includes a rotor core that is made of a soft-magnetic material. For example, the rotor core may be formed by laminating thin magnetic steel sheets (e.g., silicon steel sheets) in the axial direction thereof. On radially inner and radially outer peripheries of the rotor core, there are provided, by bonding or embedding, permanent magnets (not shown) at suitable intervals according to the lamination thicknesses of an inner stator core 7 and an outer stator core 8.

Figure 2:
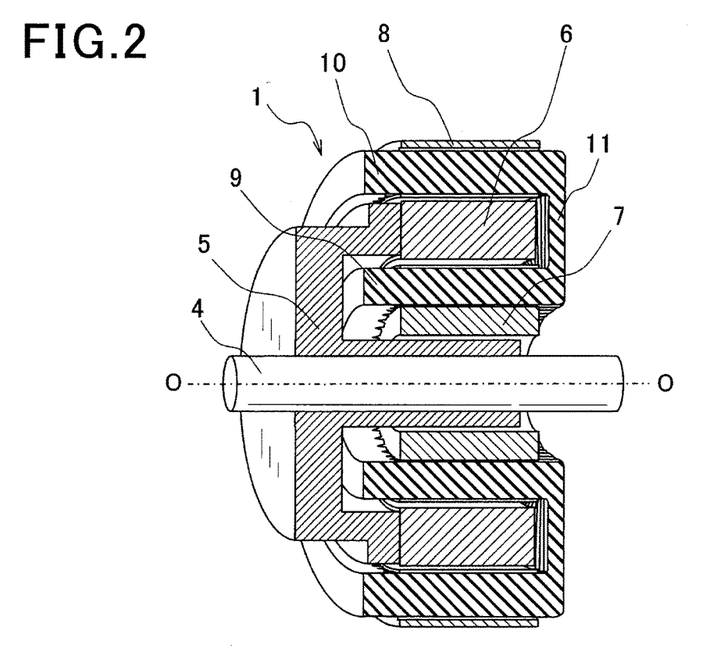
FIG. 2 is a cross-sectional perspective view of a rotor and inner and outer stators of the multi-gap rotating electric machine.

Referring further to FIG. 2, the inner stator core 7 is arranged radially inside the rotor 6 with a radially inner gap formed between the inner stator core 7 and the rotor 6. The outer stator core 8 is arranged radially outside the rotor 6 with a radially outer gap formed between the outer stator core 8 and the rotor 6. Each of the inner and outer stator cores 7 and 8 is made of a soft-magnetic material. For example, each of the inner and outer stator cores 7 and 8 may be formed by laminating thin magnetic steel sheets (e.g., silicon steel sheets) in the axial direction thereof.

Moreover, each of the inner and outer stator cores 7 and 8 has a plurality of slots formed therein. An inner stator coil 9 is wound on the inner stator core 7 so as to be received in the slots of the inner stator core 7. The inner stator core 7 and the inner stator coil 9 together constitute an inner stator of the multi-gap rotating electric machine 1. Similarly, an outer stator coil 10 is wound on the outer stator core 8 so as to be received in the slots of the outer stator core 8. The outer stator core 8 and the outer stator coil 10 together constitute an outer stator of the multi-gap rotating electric machine 1.

Further, a side stator coil 11 is provided to connect the inner and outer stator coils 9 and 10 radially across an axial end surface of the rotor 6 which is on the opposite axial side to the rotor disc 5. Specifically, the side stator coil 11 is arranged in a radial fashion with respect to the rotating shaft 4 (see FIG. 5) and protrudes from axial end surfaces of the inner and outer stator cores 7 and 8 which are on the opposite axial side to the rotor disc 5. That is, as shown in FIG. 1, the side stator coil 11 is received in a side space 12 formed between the axial end surfaces of the inner and outer stator cores 7 and 8 which are on the opposite axial side to the rotor disc 5 and an interior side surface of the housing 2 which axially faces the axial end surfaces of the inner and outer stator cores 7 and 8.

Moreover, in the side space 12, there is provided a cooling oil flow adjustment member 14a-14e (i.e., 14a according to the first embodiment, 14b according to the second embodiment, 14c according to the third embodiment, 14d according to the fourth embodiment or 14e according to the fifth embodiment) between the side stator coil 11 and the interior side surface of the housing 2. The cooling oil flow adjustment member 14a-14e is formed as a separate member from the housing 2 and fixed to the interior side surface of the housing 2 so as to make up an integral body with the housing 2. The cooling oil flow adjustment member 14a-14e has an uneven surface 19 facing the side stator coil 11. The uneven surface 19 includes a plurality of protrusions 15a-15e (i.e., 15a according to the first embodiment, 15b according to the second embodiment, 15c according to the third embodiment, 15d according to the fourth embodiment or 15e according to the fifth embodiment) and a plurality of recesses 16a-16e (i.e., 16a according to the first embodiment, 16b according to the second embodiment, 16c according to the third embodiment, 16d according to the fourth embodiment or 16e according to the fifth embodiment). Between top surfaces of the protrusions 15a-15e and axial side surfaces of the side stator coil 11, there is formed a cooling oil flow gap 18 through which cooling oil flows. It is preferable that the size (or axial width) of the cooling oil flow gap 18 is less than or equal to 1 mm.

The cooling oil flow adjustment member 14a-14e is made, preferably, of an electrically-insulative soft elastic material such as rubber. During the assembly of the multi-gap rotating electric machine 1, the side stator coil 11 may interfere with the cooling oil flow adjustment member 14a-14e due to manufacturing tolerances. In this case, if the hardness of the cooling oil flow adjustment member 14a-14e is lower than the harness of an insulating coat of the side stator coil 11, the cooling oil flow adjustment member 14a-14e will be elastically deformed, thereby preventing the insulating coat of the side stator coil 11 from being damaged due to the interference between the side stator coil 11 and the cooling oil flow adjustment member 14a-14e. Moreover, insulating coats of coils generally have a hardness of E100 according to JIS (Japanese Industrial Standards) B 7726. Therefore, to prevent the side stator coil 11 from being damaged due to contact with the cooling oil flow adjustment member 14a-14e, it is preferable for the hardness of the cooling oil flow adjustment member 14a-14e to be lower than or equal to E50 according to JIS B 7726.

In an upper part of the housing 2, there is formed a cooling oil introduction passage 13 so as to vertically penetrate the upper part of the housing 2. The cooling oil introduction passage 13 has a cooling oil inlet 13a formed at its upper end so as to be open to the outside of the housing 2 and a cooling oil outlet 13b formed at its lower end so as to be open to the side space 12. That is, the cooling oil introduction passage 13 is located vertically above the side space 12 with the cooling oil inlet 13a open on an exterior circumferential surface of the housing 2 and the cooling oil outlet 13b open on an interior circumferential surface of the housing 2.

At least part of the cooling oil outlet 13b is vertically aligned with the cooling oil flow gap 18 formed between the top surfaces of the protrusions 15a-15e of the cooling oil flow adjustment member 14a-14e and the axial side surfaces of the side stator coil 11. Consequently, the cooling oil which is supplied to the side space 12 via the cooling oil outlet 13b can reliably flow into the cooling oil flow gap 18.

First Embodiment

The cooling oil flow adjustment member 14a according to the first embodiment will be described with reference to FIGS. 3-6.

Figure 3:
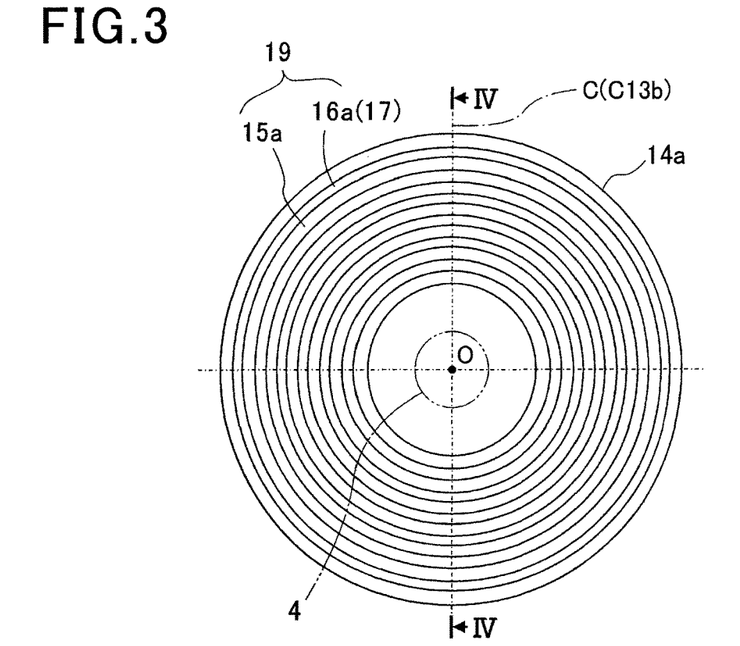
FIG. 3 is a front view of an uneven surface of a cooling oil flow adjustment member according to a first embodiment.
Figure 4:
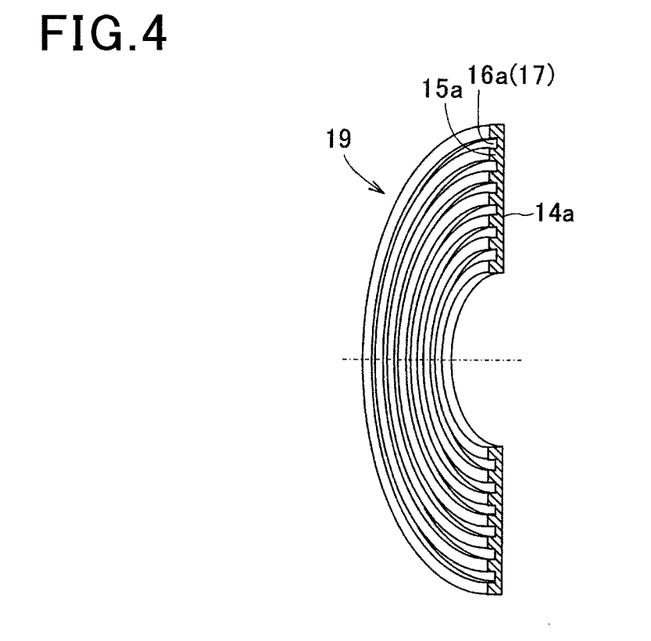
FIG. 4 is a perspective view showing the uneven surface and a cross section of the cooling oil flow adjustment member according to the first embodiment taken along the line IV-IV in FIG. 3.

In the present embodiment, the cooling oil flow adjustment member 14a has a plurality of cooling oil guide channels 17 formed of the plurality of protrusions 15a and the plurality of recesses 16a on the uneven surface 19. The protrusions 15a and the recesses 16a are shaped in circular rings concentric with the rotating shaft 4. Accordingly, the cooling oil guide channels 17 extend in the circumferential direction of the rotating shaft 4 which is different from the extending directions of the side stator coil 11 (i.e., radial directions of the rotating shaft 4). Moreover, when viewed along a central axis (or longitudinal axis) O of the rotating shaft 4, on an upper half of the uneven surface 19 which is located above the central axis O of the rotating shaft 4, the cooling oil guide channels 17 spread from a reference line C to both sides of the reference line C while extending downward; on a lower half of the uneven surface 19 which is located below the central axis O of the rotating shaft 4, the cooling oil guide channels 17 converge on the reference line C from both sides of the reference line C while extending downward.

Moreover, in the present embodiment, the reference line C is defined to vertically extend straight through the central axis O of the rotating shaft 4. The cooling oil outlet 13b is located above and adjacent to the cooling oil guide channels 17 (see FIG. 1). When viewed along the central axis O of the rotating shaft 4, a vertical central axis C13b of the cooling oil outlet 13b coincides with the reference line C (see FIG. 3).

Figure 5:
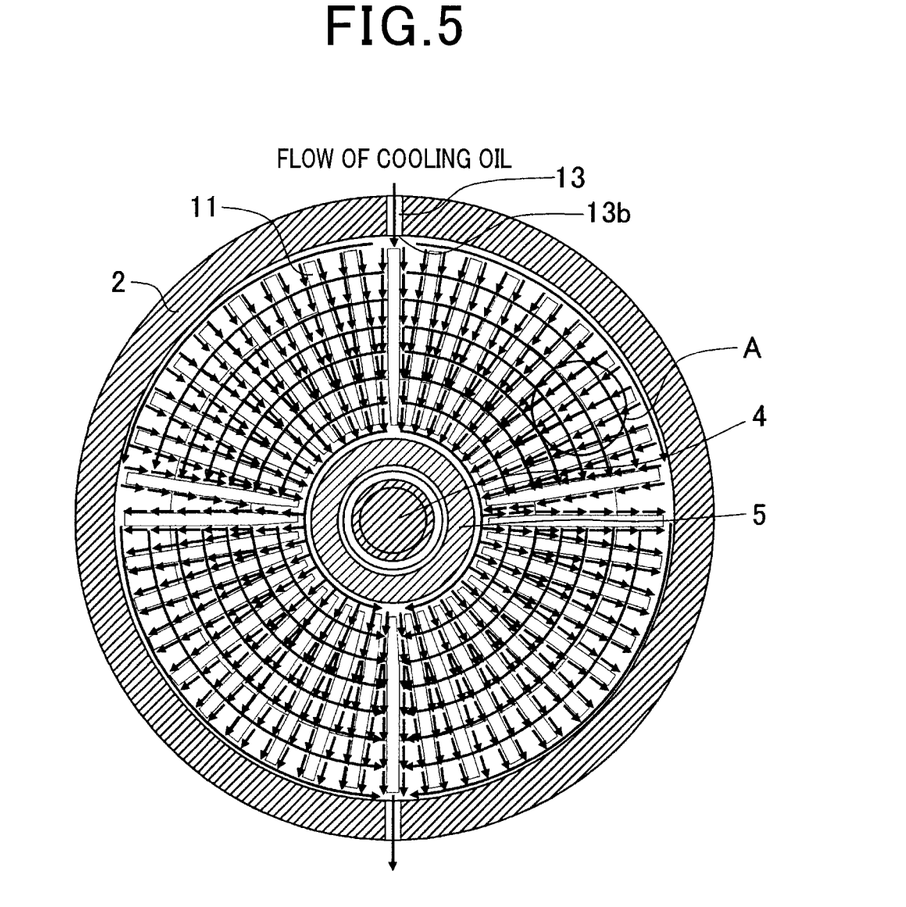
FIG. 5 is a schematic cross-sectional view, taken along the line V-V in FIG. 1, illustrating with arrows the cooling oil flow according to the first embodiment.
Figure 6:
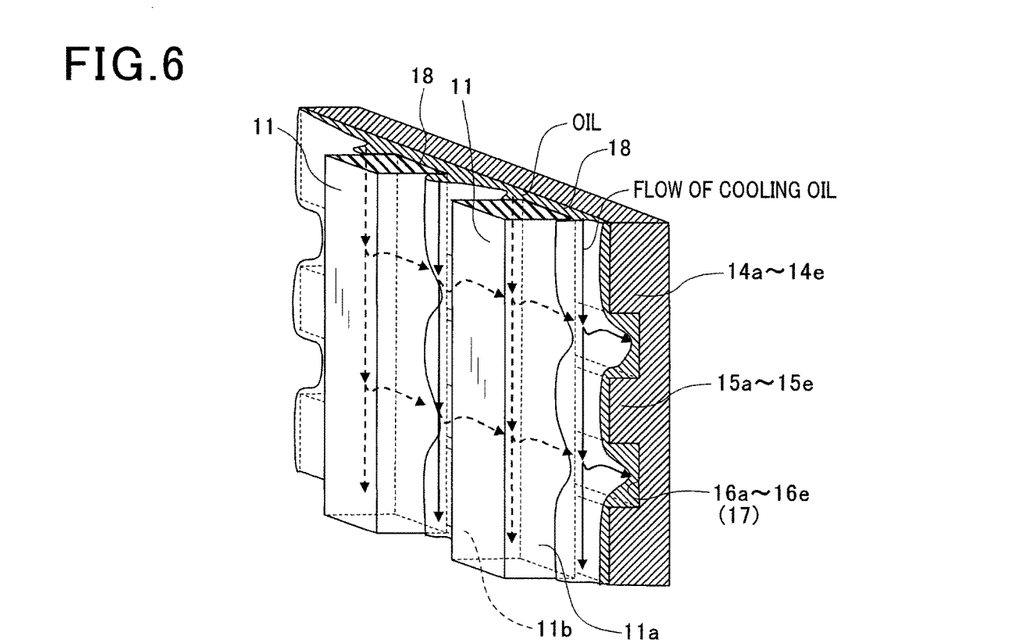
FIG. 6 is a schematic cross-sectional perspective view showing the region A of FIG. 5 through enlargement.

Between the top surfaces of the protrusions 15a of the cooling oil flow adjustment member 14a and the axial side surfaces of the side stator coil 11, there is formed the cooling oil flow gap 18. As shown in FIGS. 5 and 6, the cooling oil having flowed into the cooling oil flow gap 18 via the cooling oil outlet 13b flows by surface tension along the surfaces of the cooling oil flow adjustment member 14a and the side stator coil 11. Specifically, on the upper side of the central axis O of the rotating shaft 4, part of the cooling oil flows radially inward along circumferential side surfaces 11a and 11b of the side stator coil 11; the remainder of the cooling oil circumferentially flows along the cooling oil guide channels 17, i.e., spreads from the reference line C to both sides of the reference line C while flowing downward. Moreover, on the lower side of the central axis O of the rotating shaft 4, part of the cooling oil flows radially outward along the circumferential side surfaces 11a and 11b of the side stator coil 11; the remainder of the cooling oil circumferentially flows along the cooling oil guide channels 17, i.e., converges on the reference line C from both sides of the reference line C while flowing downward. In this way, the cooling oil flows over the entire side stator coil 11, thus increasing the contact area and contact time of the cooling oil with the side stator coil 11. As a result, it becomes possible to dissipate, via the cooling oil, an increased amount of heat from the side stator coil 11, thereby improving the cooling performance of the entire multi-gap rotating electric machine 1.

In addition, the shapes and dimensions of the protrusions 15a and recesses 16a of the cooling oil flow adjustment member 14a and thus the shapes and dimensions of the cooling oil guide channels 17 can be suitably set according to the capacity and size of the multi-gap rotating electric machine 1.

Second Embodiment

The cooling oil flow adjustment member 14b according to the second embodiment will be described with reference to FIGS. 7 and 8.

In the present embodiment, the cooling oil flow adjustment member 14b has a plurality of cooling oil guide channels 17 formed of the plurality of protrusions 15b and the plurality of recesses 16b on the uneven surface 19. The protrusions 15b and the recesses 16b are shaped in square rings concentric with the rotating shaft 4. Accordingly, the cooling oil guide channels 17 extend straight in each of a plurality of directions different from the extending directions of the side stator coil 11 (i.e., radial directions of the rotating shaft 4). Moreover, when viewed along the central axis O of the rotating shaft 4, on the upper half of the uneven surface 19 which is located above the central axis O of the rotating shaft 4, the cooling oil guide channels 17 spread from the vertical reference line C to both sides of the reference line C while extending downward; on the lower half of the uneven surface 19 which is located below the central axis O of the rotating shaft 4, the cooling oil guide channels 17 converge on the reference line C from both sides of the reference line C while extending downward.

Moreover, as in the first embodiment, the reference line C is defined to vertically extend straight through the central axis O of the rotating shaft 4. The cooling oil outlet 13b is located above and adjacent to the cooling oil guide channels 17 (see FIG. 1). When viewed along the central axis O of the rotating shaft 4, the vertical central axis C13b of the cooling oil outlet 13b coincides with the reference line C (see FIG. 7).

The cooling oil flow adjustment member 14b according to the present embodiment has the same advantages as the cooling oil flow adjustment member 14a according to the first embodiment.

Third Embodiment

The cooling oil flow adjustment member 14c according to the third embodiment will be described with reference to FIGS. 9 and 10.

In the present embodiment, the cooling oil flow adjustment member 14c has a plurality of cooling oil guide channels 17 formed of the plurality of protrusions 15c and the plurality of recesses 16c on the uneven surface 19. The protrusions 15c and the recesses 16c are shaped in elliptical rings concentric with the rotating shaft 4. Accordingly, the cooling oil guide channels 17 extend in a curved manner in directions different from the extending directions of the side stator coil 11 (i.e., radial directions of the rotating shaft 4). Moreover, when viewed along the central axis O of the rotating shaft 4, on the upper half of the uneven surface 19 which is located above the central axis O of the rotating shaft 4, the cooling oil guide channels 17 spread from the vertical reference line C to both sides of the reference line C while extending downward; on the lower half of the uneven surface 19 which is located below the central axis O of the rotating shaft 4, the cooling oil guide channels 17 converge on the reference line C from both sides of the reference line C while extending downward.

Moreover, as in the first embodiment, the reference line C is defined to vertically extend straight through the central axis O of the rotating shaft 4. The cooling oil outlet 13b is located above and adjacent to the cooling oil guide channels 17 (see FIG. 1). When viewed along the central axis O of the rotating shaft 4, the vertical central axis C13b of the cooling oil outlet 13b coincides with the reference line C (see FIG. 9).

The cooling oil flow adjustment member 14c according to the present embodiment has the same advantages as the cooling oil flow adjustment member 14a according to the first embodiment.

Fourth Embodiment

The cooling oil flow adjustment member 14d according to the fourth embodiment will be described with reference to FIGS. 11 and 12.

In the present embodiment, the cooling oil flow adjustment member 14d has a plurality of cooling oil guide channels 17 formed of the plurality of protrusions 15d and the plurality of recesses 16d on the uneven surface 19. The protrusions 15d and the recesses 16d are shaped in pairs of hyperbolas whose origins are located on the central axis O of the rotating shaft 4. Accordingly, the cooling oil guide channels 17 extend in a curved manner in directions different from the extending directions of the side stator coil 11 (i.e., radial directions of the rotating shaft 4). Moreover, when viewed along the central axis O of the rotating shaft 4, on the upper half of the uneven surface 19 which is located above the central axis O of the rotating shaft 4, the cooling oil guide channels 17 spread from the vertical reference line C to both sides of the reference line C while extending downward; on the lower half of the uneven surface 19 which is located below the central axis O of the rotating shaft 4, the cooling oil guide channels 17 converge on the reference line C from both sides of the reference line C while extending downward.

Moreover, as in the first embodiment, the reference line C is defined to vertically extend straight through the central axis O of the rotating shaft 4. The cooling oil outlet 13b is located above and adjacent to the cooling oil guide channels 17 (see FIG. 1). When viewed along the central axis O of the rotating shaft 4, the vertical central axis C13b of the cooling oil outlet 13b coincides with the reference line C (see FIG. 11).

The cooling oil flow adjustment member 14d according to the present embodiment has the same advantages as the cooling oil flow adjustment member 14a according to the first embodiment.

Fifth Embodiment

In the above-described first to fourth embodiments, the reference line C is defined to vertically extend straight through the central axis O of the rotating shaft 4. Moreover, when viewed along the central axis O of the rotating shaft 4, the vertical central axis C13b of the cooling oil outlet 13b coincides with the reference line C (see FIGS. 3, 7, 9 and 11).

Figure 13:
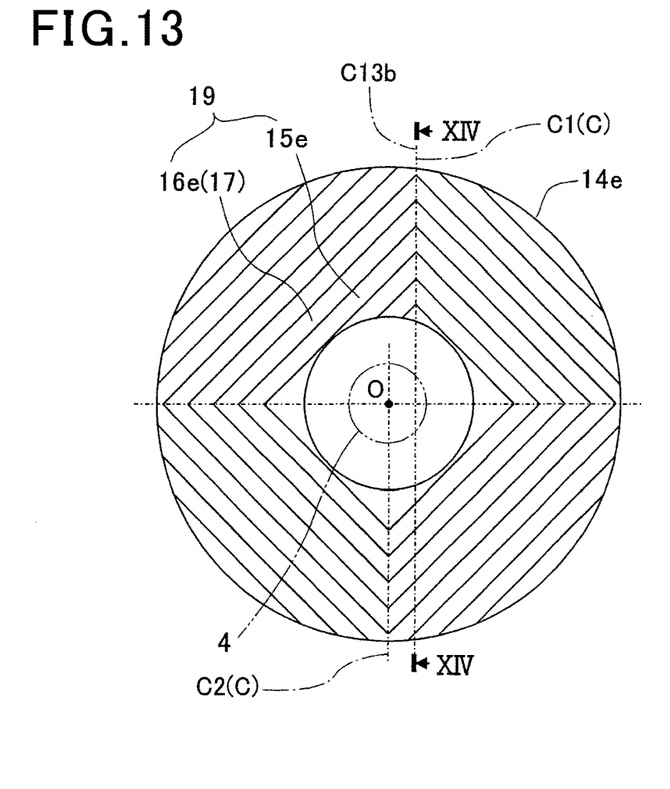
FIG. 13 is a front view of an uneven surface of a cooling oil flow adjustment member according to a fifth embodiment.
Figure 14:
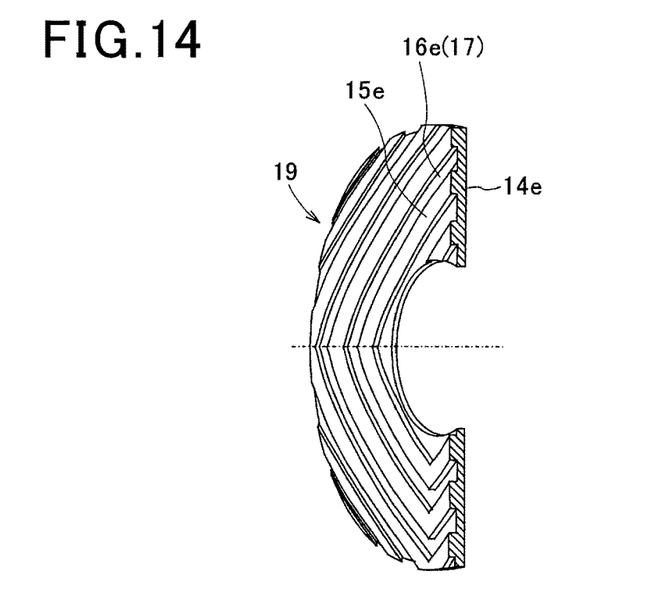
FIG. 14 is a perspective view showing the uneven surface and a cross section of the cooling oil flow adjustment member according to the fifth embodiment taken along the line XIV-XIV in FIG. 13.

In comparison, in the present embodiment, as shown in FIGS. 13-14, the reference line C consists of a first section C1 and a second section C2 which both vertically extend and are horizontally offset from each other. The first section C1 is offset from the central axis O of the rotating shaft 4 rightward by a predetermined offset distance, while the second section C2 extends through the central axis O of the rotating shaft 4. Moreover, when viewed along the central axis O of the rotating shaft 4, the first section C1 coincides with the vertical central axis C13b of the cooling oil outlet 13b; the second section C2 is offset from the vertical central axis C13b of the cooling oil outlet 13b leftward by the predetermined offset distance.

Furthermore, in the present embodiment, the cooling oil flow adjustment member 14e has a plurality of cooling oil guide channels 17 formed of the plurality of protrusions 15e and the plurality of recesses 16e on the uneven surface 19. On the upper half of the uneven surface 19 which is located above the central axis O of the rotating shaft 4, the protrusions 15e and the recesses 16e are shaped in triangles each having a side extending horizontally through the central axis O of the rotating shaft 4 and a vertex located upward from the side. The first section C1 of the reference line C vertically extends connecting all the vertices of the triangular shapes of the protrusions 15e and the recesses 16e. Accordingly, the cooling oil guide channels 17 spread from the first section C1 of the reference line C to both sides of the first section C1 while extending downward. In contrast, on the lower half of the uneven surface 19 which is located below the central axis O of the rotating shaft 4, the protrusions 15e and the recesses 16e are shaped in triangles each having a side extending horizontally through the central axis O of the rotating shaft 4 and a vertex located downward from the side. The second section C2 of the reference line C vertically extends connecting all the vertices of the triangular shapes of the protrusions 15e and the recesses 16e. Accordingly, the cooling oil guide channels 17 converge on the second section C2 of the reference line C from both sides of the second section C2 while extending downward.

Figure 15:
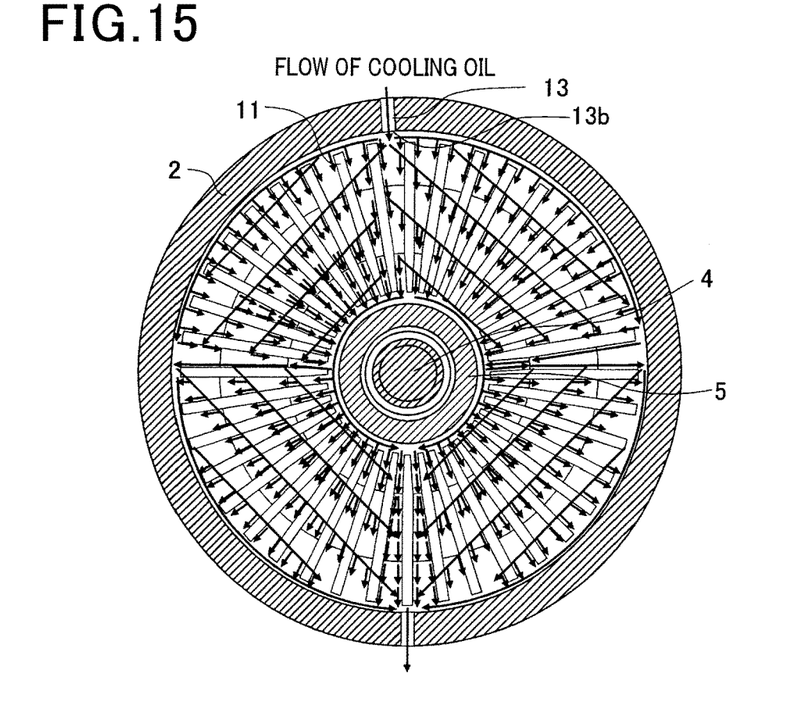
FIG. 15 is a schematic cross-sectional view, taken along the line XV-XV in FIG. 1, illustrating with arrows the cooling oil flow according to the fifth embodiment.

With the above configuration, as shown in FIG. 15, when the central axis C13b of the cooling oil outlet 13b is offset counterclockwise from an imaginary line which vertically extends through the central axis O of the rotating shaft 4, it is still possible to have the first section C1 of the reference line C coinciding with the central axis C13b of the cooling oil outlet 13b. Consequently, it is possible to achieve the same advantageous effects as described in the first embodiment.

In addition, the second section C2 of the reference line C may also be horizontally offset from the central axis O of the rotating shaft 4. For example, the second section C2 of the reference line C may also be horizontally offset from the central axis O of the rotating shaft 4 so as to coincide with the vertical central axis C13b of the cooling oil outlet 13b, as the first section C1 of the reference line C.

Advantageous Effects

According to the above-described embodiments, it is possible to achieve the following advantageous effects.

In the above-described embodiments, the multi-gap rotating electric machine 1 includes the housing 2, the rotating shaft 4, the annular rotor 6, the inner and outer stators, the side stator coil 11, the side space 12, the cooling oil introduction passage 13 and the cooling oil flow adjustment member 14a-14e. The rotating shaft 4 is rotatably supported by the housing 2 via the bearings 3. The rotor 6 is mechanically connected, via the rotor disc 5, to the rotating shaft 4 so as to rotate together with the rotating shaft 4. The inner stator includes the inner stator core 7 and the inner stator coil 9. The inner stator core 7 is arranged radially inside the rotor 6 with the radially inner gap formed between the inner stator core 7 and the rotor 6. The inner stator coil 9 is wound on the inner stator core 7. The outer stator includes the outer stator core 8 and the outer stator coil 10. The outer stator core 8 is arranged radially outside the rotor 6 with the radially outer gap formed between the outer stator core 8 and the rotor 6. The outer stator coil 10 is wound on the outer stator core 8. The side stator coil 11 is arranged on one axial side (i.e., the right side in FIG. 1) of the rotor 6 to connect the inner and outer stator coils 9 and 10 radially across the rotor 6. The side space 12 is formed between those axial end surfaces of the inner and outer stator cores 7 and 8 which are on the opposite axial side to the rotor disc 5 and that interior side surface of the housing 2 which axially faces the axial end surfaces of the inner and outer stator cores 7 and 8. In the side space 12, there is received the side stator coil 11. The cooling oil introduction passage 13 is formed in the upper part of the housing 2 to introduce cooling oil from the outside of the housing 2 to the side space 12. The cooling oil introduction passage 13 has the cooling oil inlet 13a formed at its upper end so as to be open to the outside of the housing 2 and the cooling oil outlet 13b formed at its lower end so as to be open to the side space 12. The cooling oil flow adjustment member 14a-14e is provided between the interior side surface of the housing 2 and the side stator coil 11 to adjust flow of the cooling oil in the side space 12. The cooling oil flow adjustment member has the uneven surface 19 that faces the side stator coil 11 through the cooling oil flow gap 18 formed therebetween and includes the plurality of protrusions 15a-15e and the plurality of recesses 16a-16e. The protrusions 15a-15e and the recesses 16a-16e together form the plurality of cooling oil guide channels 17 on the uneven surface 19 of the cooling oil flow adjustment member 14a-14e. When viewed along the central axis O of the rotating shaft 4: on the upper half of the uneven surface 19 which is located above the central axis O of the rotating shaft 4, the cooling oil guide channels 17 spread from the reference line C to both sides of the reference line C while extending downward; and on the lower half of the uneven surface 19 which is located below the central axis O of the rotating shaft 4, the cooling oil guide channels 17 converge on the reference line C from both sides of the reference line C while extending downward.

With the above configuration, the cooling oil having flowed into the cooling oil flow gap 18 via the cooling oil outlet 13b flows by surface tension in the extending directions of the side stator coil 11 (i.e., radial directions of the rotating shaft 4). At the same time, at the intersections between the side stator coil 11 and the cooling oil guide channels 17 formed on the uneven surface 19 of the cooling oil flow adjustment member 14a-14e, part of the cooling oil flows into and through the cooling oil guide channels 17. Consequently, it becomes possible to increase the contact area and contact time of the cooling oil with the side stator coil 11. As a result, it becomes possible to dissipate, via the cooling oil, an increased amount of heat from the side stator coil 11, thereby improving the cooling performance of the entire multi-gap rotating electric machine 1.

Moreover, in the above-described embodiments, the reference line C is defined so that when viewed along the central axis O of the rotating shaft 4, the reference line C coincides with the central axis C13b of the cooling oil outlet 13b of the cooling oil introduction passage 13.

Consequently, it becomes possible to accurately and evenly supply the cooling oil to the cooling oil guide channels 17. As a result, it becomes possible to effectively distribute the cooling oil over the entire uneven surface 19 of the cooling oil flow adjustment member 14a-14e.

In the first to the fourth embodiments, the reference line C is defined so as to vertically extend through the central axis O of the rotating shaft 4.

Consequently, it becomes possible to easily and effectively supply the cooling oil to the reference line C. As a result, it becomes possible to more evenly and effectively distribute the cooling oil to the cooling oil guide channels 17.

In the above-described embodiments, the cooling oil flow adjustment member 14a-14e is formed as a separate member from the housing 2 and fixed to the interior side surface of the housing 2 so as to make up an integral body with the housing 2.

Consequently, it becomes possible to accurately, reliably and easily arrange the uneven surface 19 of the cooling oil flow adjustment member 14a-14e in the side space 12.

In the above-described embodiments, the cooling oil flow adjustment member 14a-14e has a hardness lower than the insulating-coat hardness (or the hardness of the insulating coat) of the side stator coil 11.

Consequently, it becomes possible to prevent the side stator coil 11 from being damaged due to contact with the cooling oil flow adjustment member 14a-14e.

Moreover, in the above-described embodiments, the cooling oil flow adjustment member 14a-14e is made of the electrically-insulative soft elastic material whose hardness is lower than or equal to E50 according to JIS B 7726.

Consequently, it becomes possible to more reliably prevent the side stator coil 11 from being damaged due to contact with the cooling oil flow adjustment member 14a-14e while more reliably securing the electrical insulation of the side stator coil 11.

Figure 7:
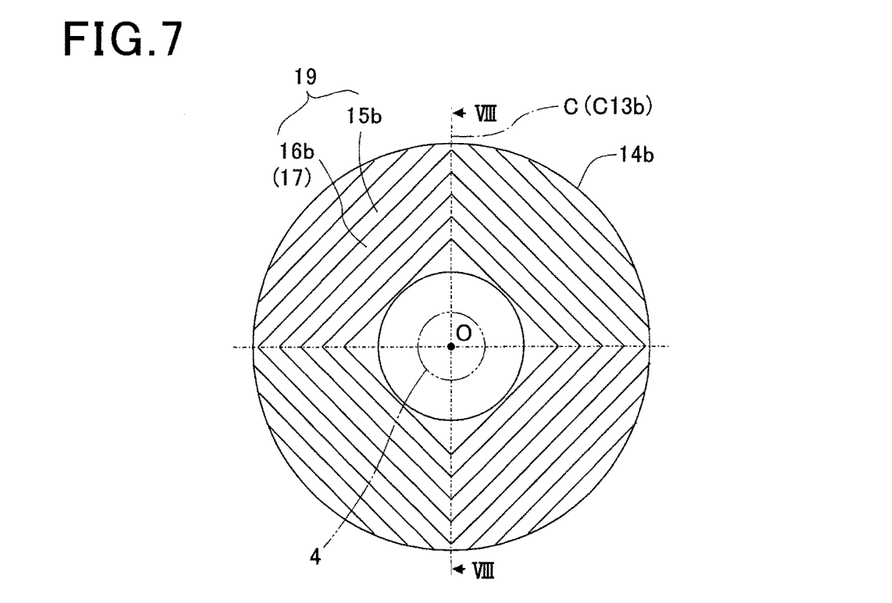
FIG. 7 is a front view of an uneven surface of a cooling oil flow adjustment member according to a second embodiment.
Figure 8:
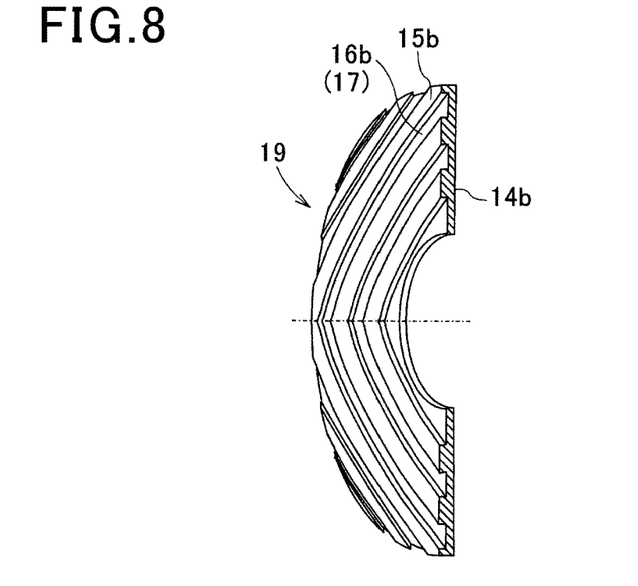
FIG. 8 is a perspective view showing the uneven surface and a cross section of the cooling oil flow adjustment member according to the second embodiment taken along the line VIII-VIII in FIG. 7.

In the second and fifth embodiments, the uneven surface 19 of the cooling oil flow adjustment member 14b or 14e is formed so that the protrusions 15b or 15e and the recesses 16b or 16e extend straight in each of a plurality of directions (see FIGS. 7 and 13).

Consequently, it becomes possible to increase the number of the cooling oil guide channels 17 intersecting the side stator coil 11. As a result, it becomes possible to increase the contact area of the cooling oil with the side stator coil 11, thereby further improving the cooling performance of the entire multi-gap rotating electric machine 1.

Figure 9:
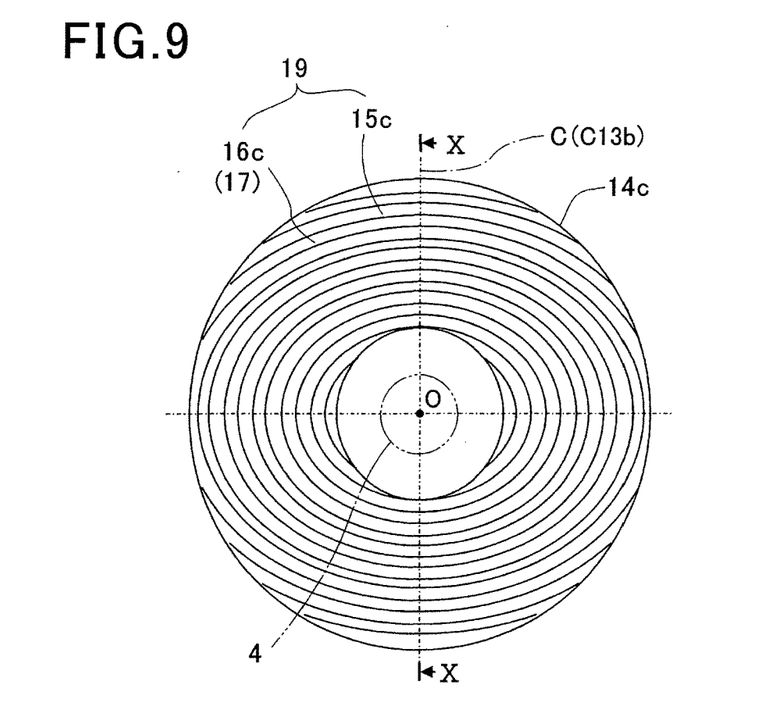
FIG. 9 is a front view of an uneven surface of a cooling oil flow adjustment member according to a third embodiment.
Figure 10:
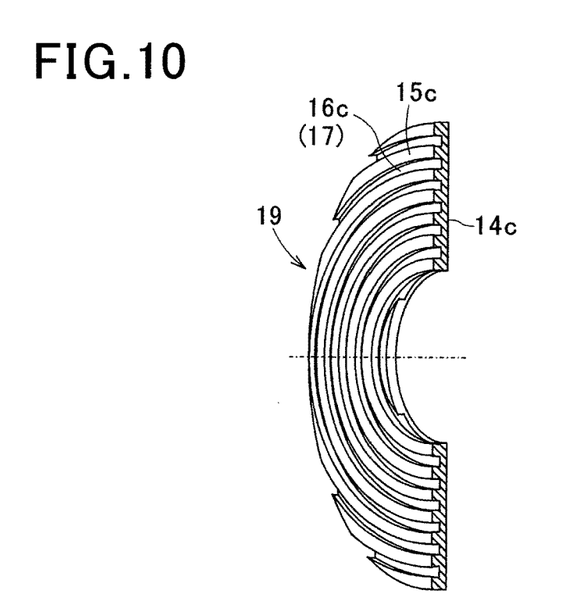
FIG. 10 is a perspective view showing the uneven surface and a cross section of the cooling oil flow adjustment member according to the third embodiment taken along the line X-X in FIG. 9.
Figure 11:
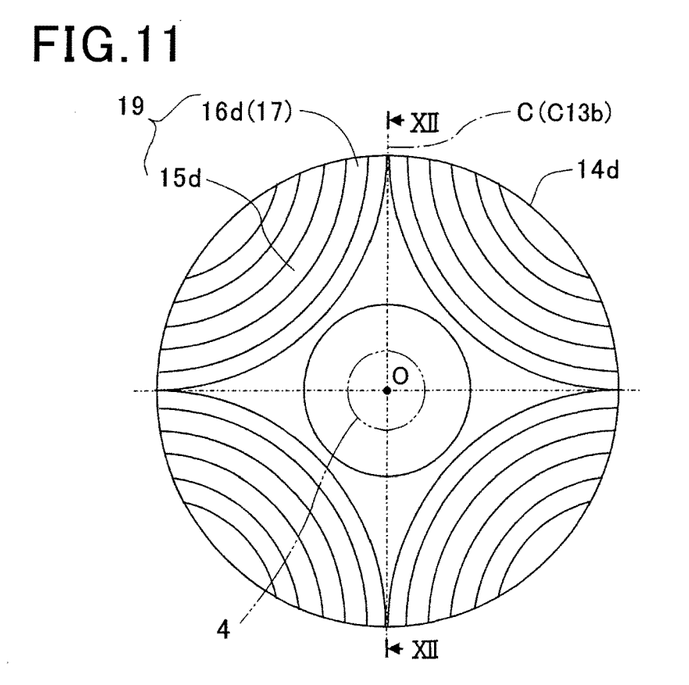
FIG. 11 is a front view of an uneven surface of a cooling oil flow adjustment member according to a fourth embodiment.
Figure 12:
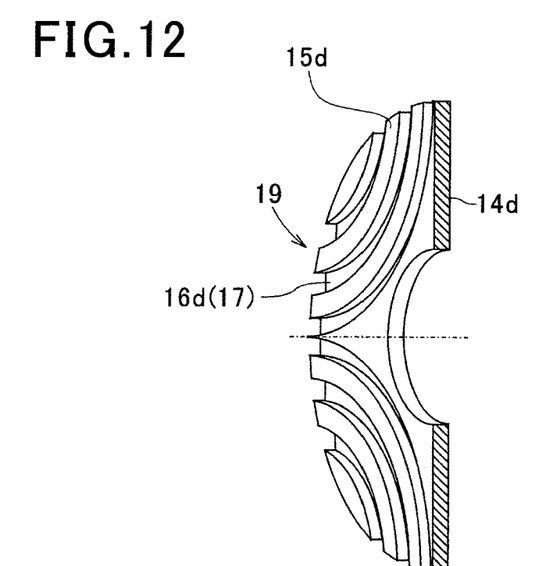
FIG. 12 is a perspective view showing the uneven surface and a cross section of the cooling oil flow adjustment member according to the fourth embodiment taken along the line XII-XII in FIG. 11.

In the first, third and fourth embodiments, the uneven surface 19 of the cooling oil flow adjustment member 14a, 14c or 14d is formed so that the protrusions 15a, 15c or 15d and the recesses 16a, 16c or 16d extend in a curved manner (see FIGS. 3, 9 and 11).

Consequently, it becomes possible to increase the number of the cooling oil guide channels 17 intersecting the side stator coil 11. As a result, it becomes possible to increase the contact area of the cooling oil with the side stator coil 11, thereby further improving the cooling performance of the entire multi-gap rotating electric machine 1.

While the above particular embodiments have been shown and described, it will be understood by those skilled in the art that various modifications, changes, and improvements may be made without departing from the spirit of the present invention.

For example, the fifth embodiment can be regarded as a modification of the second embodiment. Similarly, it is also possible to modify the first, third and fourth embodiments so that the reference line C consists of a first section C1 and a second section C2 which are arranged as described in the fifth embodiment.

What is claimed is:
1. A multi-gap rotating electric machine comprising:
a housing;
a rotating shaft rotatably supported by the housing;
an annular rotor mechanically connected to the rotating shaft so as to rotate together with the rotating shaft;
an inner stator including an inner stator core and an inner stator coil, the inner stator core being arranged radially inside the rotor with a radially inner gap formed between the inner stator core and the rotor, the inner stator coil being wound on the inner stator core;
an outer stator including an outer stator core and an outer stator coil, the outer stator core being arranged radially outside the rotor with a radially outer gap formed between the outer stator core and the rotor, the outer stator coil being wound on the outer stator core;
a side stator coil arranged on one axial side of the rotor to connect the inner and outer stator coils radially across the rotor;
a side space which is formed between axial end surfaces of the inner and outer stator cores and an interior side surface of the housing and in which the side stator coil is received;
a cooling oil introduction passage formed in an upper part of the housing to introduce cooling oil from outside of the housing to the side space, the cooling oil introduction passage having a cooling oil inlet formed at its upper end so as to be open to the outside of the housing and a cooling oil outlet formed at its lower end so as to be open to the side space; and
a cooling oil flow adjustment member provided between the interior side surface of the housing and the side stator coil to adjust flow of the cooling oil in the side space,
wherein
the cooling oil flow adjustment member has an uneven surface that faces the side stator coil through a cooling oil flow gap formed therebetween and includes a plurality of protrusions and a plurality of recesses,
the protrusions and the recesses together form a plurality of cooling oil guide channels on the uneven surface of the cooling oil flow adjustment member,
the protrusions and the recesses are formed alternately in a radial direction of the rotating shaft,
each of the cooling oil guide channels is formed between one radially-adjacent pair of the protrusions,
when viewed along a central axis of the rotating shaft:
on an upper part of the uneven surface which is located above the central axis of the rotating shaft, the cooling oil guide channels spread from a reference line to both sides of the reference line while extending downward; and
on a lower part of the uneven surface which is located below the central axis of the rotating shaft, the cooling oil guide channels converge on the reference line from both sides of the reference line while extending downward.

2. The multi-gap rotating electric machine as set forth in claim 1, wherein when viewed along the central axis of the rotating shaft, the reference line coincides with a central axis of the cooling oil outlet of the cooling oil introduction passage.

3. The multi-gap rotating electric machine as set forth in claim 1, wherein the reference line vertically extends through the central axis of the rotating shaft.

4. The multi-gap rotating electric machine as set forth in claim 1, wherein the cooling oil flow adjustment member is formed as a separate member from the housing and fixed to the interior side surface of the housing so as to make up an integral body with the housing.

5. The multi-gap rotating electric machine as set forth in claim 1, wherein the cooling oil flow adjustment member has a hardness lower than an insulating-coat hardness of the side stator coil.

6. The multi-gap rotating electric machine as set forth in claim 1, wherein the cooling oil flow adjustment member is made of an electrically insulative material whose hardness is lower than or equal to E50 according to JIS B 7726.

7. The multi-gap rotating electric machine as set forth in claim 1, wherein the uneven surface of the cooling oil flow adjustment member is formed so that the protrusions and the recesses extend straight in each of a plurality of directions.

8. The multi-gap rotating electric machine as set forth in claim 1, wherein the uneven surface of the cooling oil flow adjustment member is formed so that the protrusions and the recesses extend in a curved manner.

9. The multi-gap rotating electric machine as set forth in claim 1, wherein the side stator coil is located outside the cooling oil guide channels.

\* \* \* \* \*